United States Patent
Won et al.

(10) Patent No.: US 10,539,725 B2
(45) Date of Patent: Jan. 21, 2020

(54) OPTICAL FILTER AND CAMERA MODULE AND ELECTRONIC DEVICE

(71) Applicant: SAMSUNG ELECTRONICS CO., LTD., Suwon-si (KR)

(72) Inventors: Jong Hoon Won, Yongin-si (KR); Yong Joo Lee, Suwon-si (KR); Changki Kim, Suwon-si (KR); Hyung Jun Kim, Suwon-si (KR); Myungsup Jung, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 21 days.

(21) Appl. No.: 15/586,031

(22) Filed: May 3, 2017

(65) Prior Publication Data

US 2018/0149783 A1    May 31, 2018

(30) Foreign Application Priority Data

Nov. 30, 2016    (KR) .................. 10-2016-0162275

(51) Int. Cl.
    *G02B 5/20* (2006.01)
    *G02B 5/22* (2006.01)
    *G02B 5/28* (2006.01)

(52) U.S. Cl.
    CPC ............. *G02B 5/208* (2013.01); *G02B 5/223* (2013.01); *G02B 5/282* (2013.01); *G02B 5/285* (2013.01)

(58) Field of Classification Search
    CPC .......... G02B 5/208; G02B 5/22; G02B 5/223; G02B 5/282; G02B 5/285
    USPC .................................. 359/359, 361
    See application file for complete search history.

(56) References Cited

U.S. PATENT DOCUMENTS

| | | | |
|---|---|---|---|
| 9,575,213 B2 | 2/2017 | Nagaya et al. | |
| 2010/0053035 A1 | 3/2010 | Lee et al. | |
| 2014/0091419 A1* | 4/2014 | Hasegawa | G02B 13/004 257/432 |
| 2016/0195651 A1 | 7/2016 | Yoshioka et al. | |
| 2017/0003417 A1 | 1/2017 | Nagaya et al. | |
| 2017/0003425 A1 | 1/2017 | Nagaya et al. | |
| 2017/0146708 A1 | 5/2017 | Lah | |
| 2018/0074241 A1 | 3/2018 | Jung et al. | |

FOREIGN PATENT DOCUMENTS

| | | |
|---|---|---|
| EP | 1111410 | 6/2001 |
| JP | 4985039 | 7/2012 |
| KR | 101047946 | 7/2011 |
| KR | 1020140088559 | 7/2014 |

(Continued)

OTHER PUBLICATIONS

Extended European Search Report—European Patent Application No. 17204462.0 dated Apr. 6, 2018.

*Primary Examiner* — Evan P Dzierzynski
*Assistant Examiner* — Mitchell T Oestreich
(74) *Attorney, Agent, or Firm* — Cantor Colburn LLP (57) ABSTRACT

An optical filter includes a polymer film and a near infrared absorbing layer on the polymer film, where the near infrared absorbing layer transmits light in a visible wavelength region and selectively absorbs at least a part of light in a near infrared wavelength region. An average light transmittance of the optical filter in a wavelength region of about 700 nanometers (nm) to about 740 nm is less than about 7%.

20 Claims, 5 Drawing Sheets

(56) References Cited

FOREIGN PATENT DOCUMENTS

| KR | 101453469 | 10/2014 |
|----|-----------|---------|
| KR | 1020160094389 | 8/2016 |
| KR | 1020160111877 | 9/2016 |
| WO | 2016158819 | 10/2016 |

* cited by examiner

OPTICAL FILTER AND CAMERA MODULE AND ELECTRONIC DEVICE

CROSS-REFERENCE TO RELATED APPLICATION

This application claims priority to Korean Patent Application No. 10-2016-0162275, filed on Nov. 30, 2016, and all the benefits accruing therefrom under 35 U.S.C. § 119, the content of which in its entirety is herein incorporated by reference.

BACKGROUND

1. Field

The disclosure relates to an optical filter, a camera module, and an electronic device.

2. Description of the Related Art

Recently, an electronic device including an image sensor that stores an image as an electrical signal, such as a cell phone, a digital camera, a camcorder and a camera, has been widely used.

Such an electronic device may include an optical filter to reduce or prevent generation of an optical distortion by light in other wavelength regions other than a visible wavelength region.

SUMMARY

Embodiments of the invention relate to an optical filter having a thin thickness and that substantially decreases or effectively prevents optical distortion.

Another embodiment relates to a camera module including the optical filter.

Yet another embodiment relates to an electronic device including the optical filter.

According to an embodiment, an optical filter includes a polymer film and a near infrared absorbing layer on the polymer film, where the near infrared light-absorbing layer transmits light in a visible wavelength region and selectively absorbs at least a part of light in a near infrared wavelength region. In such an embodiment, an average light transmittance of the optical filter in a wavelength region of about 700 nanometers (nm) to about 740 nm is less than about 7%.

In an embodiment, the optical filter may have a maximum absorption wavelength in a wavelength region of about 600 nm to about 800 nm.

In an embodiment, the average light transmittance of the optical filter in the wavelength region of about 700 nm to about 740 nm may be less than or equal to about 5%.

In an embodiment, an average light transmittance of the optical filter in a wavelength region of about 700 nm to about 900 nm may be less than or equal to about 30%.

In an embodiment, an average light transmittance of the optical filter in a wavelength region of about 430 nm to about 630 nm may be greater than or equal to about 80%.

In an embodiment, the near infrared absorbing layer may include a near infrared absorption material which selectively absorbs the part of the light in the near infrared wavelength region and a binder.

In an embodiment, the near infrared absorption material may include a metal-free organic material.

In an embodiment, the near infrared absorption material may include a polymethine compound, a cyanine compound, a phthalocyanine compound, a merocyanine compound, naphthalocyanine, an immonium compound, a diimmonium compound, a triarylmethane compound, a dipyrromethene compound, an anthraquinone compound, naphthoquinone, a diquinone compound, a squarylium compound, a rylene compound, a perylene compound, a squaraine compound, a pyrylium compound, a thiopyrylium compound, a diketopyrrolopyrrole compound, a derivative thereof, or a combination thereof.

In an embodiment, the binder may be a thermosetting binder, a photocurable binder, or a combination thereof.

In an embodiment, the near infrared absorbing layer may be obtained by coating a solution including the near infrared absorption material and the binder on the polymer film and drying the polymer film on which the solution is coated.

In an embodiment, the polymer film may include polyethyleneterephthalate, polyethylenenaphthalate, triacetyl cellulose ("TAC"), polycarbonate, a cycloolefin polymer, poly(meth)acrylate, polyimide, or a combination thereof.

In an embodiment, the polymer film may selectively absorb at least a part of light in an ultraviolet ("UV") wavelength region.

In an embodiment, an average light transmittance of the optical filter in a wavelength region of about 350 nm to about 380 nm be may be less than or equal to about 1%.

In an embodiment, the optical filter may further include an infrared blocking layer on at least one of the polymer film and the near infrared absorbing layer.

In an embodiment, the infrared blocking layer may include a first layer and a second layer, which are alternately and repeatedly stacked one on another, where the first layer and the second layer include materials having different refractive indexes from each other, respectively.

In an embodiment, the infrared blocking layer may block light in a wavelength region of about 700 nm to about 3 micrometers (µm).

In an embodiment, the optical filter may have a thickness in a range of about 30 µm to about 150 µm.

According to another embodiment, a camera module includes the optical filter.

In an embodiment, the camera module may further include a lens and an image sensor.

According to yet another embodiment, an electronic device includes the optical filter.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of an optical filter according to the invention will be described with reference to the accompanying drawings.

Figure 1:
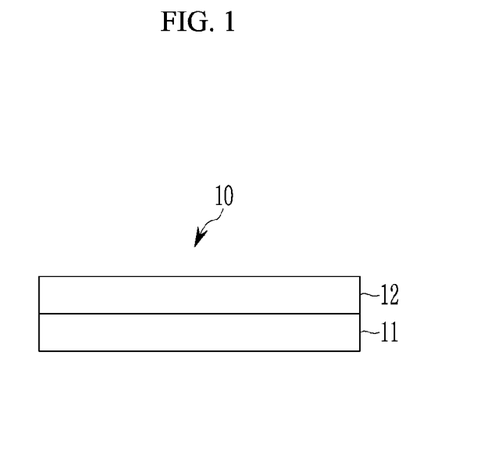
FIG. 1 is a schematic cross-sectional view showing an optical filter according to an embodiment.

FIG. 1 is a schematic cross-sectional view showing an optical filter according to an embodiment.

Referring to FIG. 1, an embodiment of the optical filter 10 includes a polymer film 11 and a near infrared absorbing layer 12.

The polymer film 11 may be a transparent polymer film and have an average light transmittance of greater than or equal to about 80% in a visible wavelength region. In one embodiment, for example, the polymer film 11 may have average light transmittance of greater than or equal to about 85% in the visible wavelength region. Herein, the visible wavelength region may be a wavelength region of greater than about 380 nanometers (nm) and less than about 700 nm, and the average light transmittance is an average value of light transmittance measured when incident light in the visible wavelength region is radiated in a vertical direction (a front side direction or a thickness direction) of the polymer film 11.

The polymer film 11 may include, for example, polyethyleneterephthalate, polyethylenenaphthalate, triacetyl cellulose, polycarbonate, cycloolefin polymer, poly(meth)acrylate, polyimide, or a combination thereof, but is not limited thereto.

The polymer film 11 may selectively absorb at least a part of light in an ultraviolet ("UV") wavelength region. Herein, the UV wavelength region may be, for example, a wavelength region of less than or equal to about 380 nm.

In an embodiment, the polymer film 11 may absorb most of light in a wavelength region of about 350 nm to about 380 nm. In such an embodiment, an average light transmittance of the optical filter 10 in the wavelength region of about 350 nm to 380 nm may be less than or equal to about 1%. In one embodiment, for example, the average light transmittance of the optical filter 10 in the wavelength region of about 350 nm to 380 nm may be less than or equal to about 0.8% or less than or equal to about 0.5%.

The polymer film 11 may include various additives according to desired properties of the optical filter 10.

The polymer film 11 may have a thickness in a range of about 20 micrometers (μm) to about 120 μm.

The near infrared absorbing layer 12 may transmit light in a visible wavelength region (or visible spectrum) and selectively absorb at least a part of light in a near infrared wavelength region (or near infrared spectrum). Herein, the visible wavelength region may be, for example, a wavelength region of greater than about 380 nm and less than about 700 nm, and the near infrared wavelength region may be, for example, a wavelength region of about 700 nm to about 900 nm.

The near infrared absorbing layer 12 may include a near infrared absorption material that selectively absorbs at least a part of light in the near infrared wavelength region, and a binder.

The near infrared absorption material may be a material that selectively absorbs light in the near infrared wavelength region, but is not particularly limited. In an embodiment, the near infrared absorption material may be an organic material, an inorganic material, an organic/inorganic material, or a combination thereof.

The near infrared absorption material may include, for example, a metal-free organic material. In one embodiment, for example, the near infrared absorption material may include a polymethine compound, a cyanine compound, a phthalocyanine compound, a merocyanine compound, naphthalocyanine, immonium compound, a diimmonium compound, a triarylmethane compound, a dipyrromethene compound, an anthraquinone compound, naphthoquinone, a diquinone compound, a squarylium compound, a rylene compound, a perylene compound, a squaraine compound, a pyrylium compound, a thiopyrylium compound, a diketopyrrolopyrrole compound, a derivative thereof or a combination thereof, but is not limited thereto.

The binder may be, for example, an organic binder, an inorganic binder, an organic/inorganic binder or a combination thereof. In an embodiment, the binder may be mixed with the near infrared absorption material or may disperse the near infrared absorption material. The binder is not particularly limited as long as the binder effectively attaches the near infrared absorption material to the polymer film 11.

In an embodiment, the binder may be a curable binder. In one embodiment, for example, the binder may be a thermosetting binder, a photocurable binder or a combination thereof.

The binder may include, for example, (meth)acryl, methyl cellulose, ethyl cellulose, hydroxypropyl methyl cellulose ("HPMC"), hydroxypropyl cellulose ("HPC"), a xanthan gum, polyvinyl alcohol ("PVA"), polyvinylpyrrolidone ("PVP"), carboxylmethyl cellulose, hydroxyethyl cellulose, silicone, organic-inorganic hybrid materials, a copolymer thereof or a combination thereof, but is not limited thereto.

In an embodiment, the near infrared absorption material may be included at a content of about 0.01 to about 50 parts by weight based on 100 parts by weight of the binder. In one embodiment, for example, the near infrared absorption material may be included at a content of about 0.01 to about 30 parts by weight, about 0.01 to about 20 parts by weight, about 0.01 to 15 parts by weight, or about 0.01 to about 10 parts by weight, based on 100 parts by weight of the binder.

In an embodiment, the near infrared absorbing layer 12 may be formed from a solution including the near infrared absorption material, the binder, and optionally a solvent.

The solvent is not particularly limited, as long as the solvent effectively dissolves and/or disperses the near infrared absorption material and the binder. In an embodiment, the solvent may include, for example, at least one selected from: water; an alcohol based solvent such as methanol, ethanol, n-propyl alcohol, isopropyl alcohol, n-butanol, isobutanol, t-butanol, propylene glycol, propylene glycolmethylether, ethylene glycol, and the like; an aliphatic hydrocarbon solvent such as hexane, heptane, and the like; an aromatic hydrocarbon solvent such as toluene, pyridine, quinoline, anisole, mesitylene, xylene, and the like; a ketone-based solvent such as methyl isobutyl ketone, 1-methyl-2-pyrrolidinone ("NMP"), cyclohexanone, acetone, and the like; an ether-based solvent such as tetrahydrofuran, isopropyl ether, and the like; an acetate-based solvent such as ethyl acetate, butyl acetate, propylene glycol methyl ether acetate, and the like; an amide-based solvent such as dimethylacetamide, dimethyl formamide ("DMF"), and the like; a nitrile-based solvent such as acetonitrile, benzonitrile, and the like; and a mixture of the solvents, but is not limited thereto.

The solution may be coated on the polymer film 11 and dried, and optionally cured by heat and/or light. The coating may be, for example, a spin coating, a slit coating, a bar coating, a blade coating, a slot die coating, and/or an inkjet coating. The drying may be, for example, performed by natural drying, hot air drying, and/or a heat treatment at a higher temperature than the boiling point of the solvent.

The near infrared absorbing layer 12 may have a thickness of about 3 μm to about 50 μm, for example.

The optical filter 10 has a structure in which the polymer film 11 and the near infrared absorbing layer 12 are sequentially stacked one on another, and thereby light in a visible wavelength region may be effectively transmitted therethrough and light in a near infrared wavelength region may be effectively blocked thereby. In an embodiment, light in an UV wavelength region may be effectively blocked by the polymer film 11 having an absorption function of light in a UV wavelength region. Accordingly, the optical filter 10 may effectively sense light in a visible wavelength region in a sensor for sensing light such as an image sensor by increasing purity of transmittance of light in the visible wavelength region among light in all wavelength regions, and thus optical distortion by light besides visible wavelength region may be substantially decreased or effectively prevented.

The optical filter 10 may effectively transmit light in the visible wavelength region and selectively block light in the near infrared wavelength region by a combination of the polymer film 11 and the near infrared absorbing layer 12.

In one embodiment, for example, the optical filter 10 may have an average light transmittance of greater than or equal to about 70% in a visible wavelength region of greater than about 380 nm and less than about 700 nm. In one embodiment, for example, the optical filter 10 may have an average light transmittance of greater than or equal to about 80% in a wavelength region of about 430 nm to about 630 nm. Herein, the average light transmittance refers to an average value of light transmittance measured when incident light is radiated in a vertical direction (a front side direction or a thickness direction) of the optical filter 10.

In one embodiment, for example, the optical filter 10 may have an average light transmittance of less than or equal to about 40%, less than or equal to about 30%, or less than or equal to about 28%, in a near infrared wavelength region of about 700 nm to about 900 nm.

In one embodiment, for example, the optical filter 10 may have an average light transmittance of less than about 7%, less than about 5%, or less than about 4.5%, in a wavelength region of about 700 nm to about 740 nm.

In one embodiment, for example, the optical filter 10 may have a maximum absorption wavelength ($\lambda_{max}$) in a wavelength region of about 600 nm to about 800 nm, a maximum absorption wavelength ($\lambda_{max}$) in a wavelength region of about 700 nm to about 800 nm, a maximum absorption wavelength ($\lambda_{max}$) in a wavelength region of about 700 nm to 760 nm, or a maximum absorption wavelength ($\lambda_{max}$) in a wavelength region of about 720 nm to about 750 nm.

In one embodiment, for example, the optical filter 10 may have an average light transmittance of less than or equal to about 1%, less than or equal to about 0.8%, or less than or equal to about 0.5%, in a wavelength region of about 350 nm to about 380 nm.

In one embodiment, for example, the optical filter 10 has high absorptivity and low light transmittance for a near infrared wavelength region, and a relatively low absorption rate and high light transmittance for a mid-infrared wavelength region and a far-infrared wavelength region.

In an embodiment, the optical filter 10 may have, for example a thickness in a range of about 30 μm to about 150 μm, such that a thin optical filter may be realized.

In such an embodiment, as described above, the optical filter 10 selectively absorbs light in a near infrared wavelength region between a visible wavelength region and an infrared wavelength region of light among all wavelength regions, and thereby blocks the light in the near infrared wavelength region, and thereby a cross or mixing of a signal by light in a visible wavelength region and a signal by light in a non-visible wavelength region may be effectively prevented such that optical distortion such as a crosstalk is substantially decreased or effectively prevented.

In such an embodiment, the optical filter 10 effectively absorbs light in the near infrared wavelength region regardless of an incidence direction, and thus effectively absorbs incident light in the near infrared wavelength region from a side direction to block the incident light, and thereby a distortion of a signal by light in a visible wavelength region by incident light in the near infrared wavelength region from a side may be substantially decreased or effectively prevented.

Hereinafter, an optical filter according to an alternative embodiment will be described.

Figure 2:
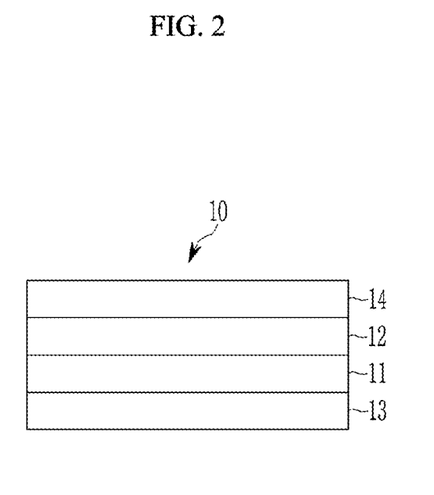
FIG. 2 is a schematic cross-sectional view showing an optical filter according to an alternative embodiment.

FIG. 2 is a schematic cross-sectional view showing an optical filter according to an alternative embodiment.

Referring to FIG. 2, an alternative embodiment of an optical filter 10 includes a polymer film 11, a near infrared absorbing layer 12, and infrared blocking layers 13 and 14.

In such an embodiment, the polymer film 11 and the near infrared absorbing layer 12 are substantially the same as those of the embodiments described above.

The infrared blocking layers 13 and 14 may be disposed under the polymer film 11 and/or on the near infrared absorbing layer 12. In an embodiment, as shown in FIG. 2, the infrared blocking layers 13 and 14 may include two layers, but not being limited thereto. Alternatively, one of the two layers may be omitted.

The infrared blocking layers 13 and 14 effectively reflect light in an infrared wavelength region, and thereby optical distortion by light in the infrared wavelength region may be substantially decreased or effectively prevented.

The infrared blocking layers 13 and 14 may reflect light in a part of a near infrared wavelength region, a mid-infrared wavelength region and a far-infrared wavelength region. In one embodiment, for example, the infrared blocking layers 13 and 14 may reflect light in a wavelength region of about 700 nm to about 3 μm.

The infrared blocking layers 13 and 14 are not particularly limited as long as the infrared blocking layers 13 and 14 reflect light in an infrared wavelength region. In one embodiment, for example, the infrared blocking layers 13 and 14 may a high refractive index reflective layer, a reflective layer including a high refractive index nanoparticle, or a multilayer including a plurality of layers having different refractive indexes, but are not limited thereto.

In one embodiment, for example, each of the infrared blocking layers 13 and 14 includes a first layer and a second layer including materials having different refractive indexes from each other. In such an embodiment, each of the infrared blocking layers 13 and 14 may have a multilayer where the first layer and the second layer are alternately and repeatedly stacked.

The first layer and the second layer may be, for example, a dielectric layer including an oxide layer, a nitride layer, an oxynitride layer, a sulfide layer, or a combination thereof. In an embodiment, the first layer may have a refractive index of less than about 1.7, and the second layer may have a refractive index of greater than or equal to about 1.7. In one embodiment, for example, the first layer may have a refractive index of greater than or equal to about 1.1 and less than about 1.7, and the second layer may have a refractive index in a range of about 1.7 to about 2.7. In one embodiment, for example, the first layer may have a refractive index of about 1.2 to about 1.6, and the second layer may have a refractive index of about 1.8 to about 2.5.

The first layer and the second layer may include any material having the refractive indexes within the ranges described above. In one embodiment, for example the first layer may include a silicon oxide, an aluminum oxide or a combination thereof, and the second layer may include titanium oxide, zinc oxide, indium oxide, zirconium oxide or a combination thereof. In an embodiment, the total number of the first and second layers in each of the infrared blocking layers 13 and 14 may be, for example, in a range of 5 to 80, or in a range of 5 to 50.

Thicknesses of the first layer and the second layer may be determined based on a refractive index and a reflection wavelength thereof. In one embodiment, for example, the first layer may have a thickness in a range of about 10 nm to about 700 nm, and the second layer may have a thickness in a range of about 30 nm to about 600 nm. Thicknesses of the first layer and the second layer may be the same as each other or different from each other.

In an embodiment, the optical filter 10 may have, for example, a thickness in a range of about 30 μm to about 150 μm, such that a thin optical filter may be realized.

In an embodiment, an optical filter 10 includes the polymer film 11 and the near infrared absorbing layer 12, and transmits light in a visible wavelength region effectively and blocks light in a near infrared wavelength region effectively. In such an embodiment, the optical filter 10 may further include infrared blocking layers 13 and 14 and reflect light in a mid-infrared wavelength region and a far-infrared wavelength region to block effectively the light, and thereby may be used as an optical filter for preventing transmission of light in all infrared wavelength regions. Accordingly, such an embodiment of the optical filter 10 may be applied to an electronic device and a distortion of an optical signal of a visible wavelength region by light in an infrared wavelength region may be may be substantially decreased or effectively prevented.

The optical filter 10 may be applied to all uses for filtering light in an infrared wavelength region, and may be, for example, applied to a camera module and an electronic device including the camera module.

The electronic device may be a digital camera, a camcorder, a monitoring camera such as a closed-circuit television ("CCTV"), an in-car camera, a medical camera, a cell phone having a built-in or external camera, a computer having a built-in or external camera, a laptop computer having a built-in or external camera and the like, but is not limited thereto.

Figure 3:
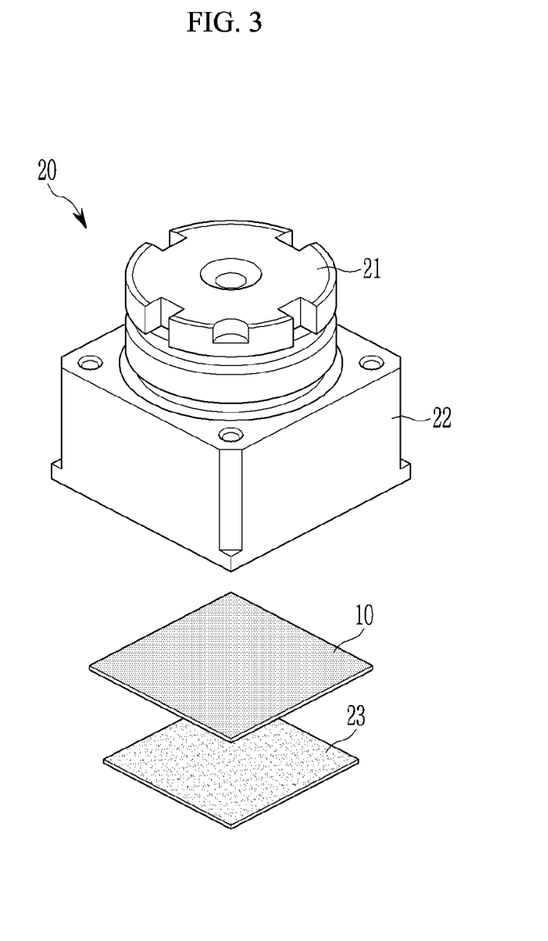
FIG. 3 is a schematic view showing a camera module according to an embodiment.

FIG. 3 is a schematic view showing a camera module according to an embodiment.

Referring to FIG. 3, an embodiment of a camera module 20 includes a lens barrel 21, a housing 22, an optical filter 10, and an image sensor 23.

The lens barrel 21 includes at least one lens that images a subject. In such an embodiment, the lens may be disposed along an optical axis direction. Herein, the optical axis direction may be a vertical direction of the lens barrel 21.

The lens barrel 21 is internally housed in the housing 22 and coupled with the housing 22. The lens barrel 21 may be moved in optical axis direction inside the housing 22 for autofocusing.

The housing 22 supports and houses the lens barrel 21, and a portion thereof may be open in the optical axis direction. Accordingly, incident light from a surface of the housing 22 may reach the image sensor 23 through the lens barrel 21 and the optical filter 10.

The housing 22 may be equipped with an actuator for moving the lens barrel 21 in the optical axis direction. The actuator may include a voice coil motor ("VCM") including a magnet and a coil. However, various methods such as a mechanical driving system or a piezoelectric driving system using a piezoelectric device other than the actuator may be adopted.

The optical filter 10 is substantially the same as that described above.

The image sensor 23 may concentrate an image of a subject and thus store the image as data, and the stored data may be displayed as an image through a display media.

The image sensor 23 may be mounted on a substrate (not shown) and electrically connected with the substrate. The substrate may be, for example, a printed circuit board ("PCB") or electrically connected to a PCB. In such an embodiment, the PCB may be, for example, flexible printed circuit board ("FPCB").

The image sensor 23 concentrates light passing the lens barrel 21 and the optical filter 10 and generates a video signal. In an embodiment, the image sensor 23 may be a complementary metal-oxide semiconductor ("CMOS") image sensor and/or a charge coupled device ("CCD") image sensor.

Figure 4:
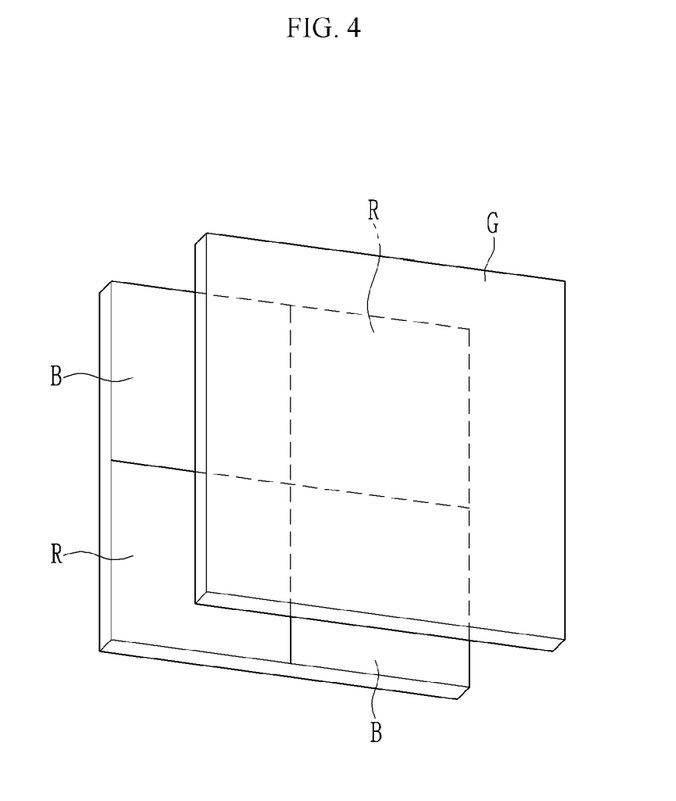
FIG. 4 is a top plan view showing an exemplary embodiment where an image sensor is an organic complementary metal-oxide semiconductor ("CMOS") image sensor.
Figure 5:
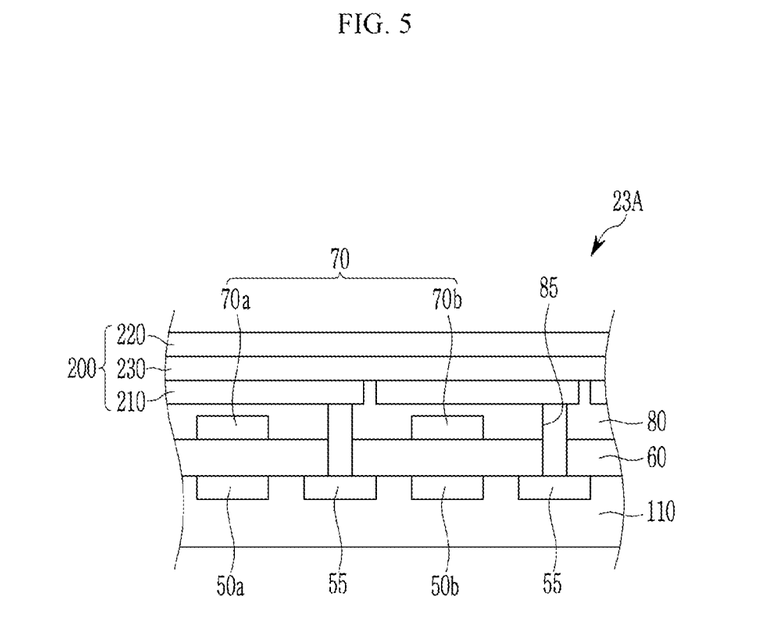
FIG. 5 is a cross-sectional view showing the organic CMOS image sensor of FIG. 4.

FIG. 4 is a top plan view showing an embodiment of an organic CMOS image sensor, and FIG. 5 is a cross-sectional view showing the organic CMOS image sensor of FIG. 4.

Referring to FIGS. 4 and 5, an embodiment of an organic CMOS image sensor 23A includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 200.

The semiconductor substrate 110 may be a silicon substrate, and may be integrated with the photo-sensing devices 50a and 50b, the transmission transistor (not shown) and the charge storage 55. The photo-sensing devices 50a and 50b may be photodiodes.

The photo-sensing devices 50a and 50b, the transmission transistor, and/or the charge storage 55 may be integrated in each pixel. In one embodiment, for example, the photo-sensing devices 50a and 50b may be included in a blue pixel and a red pixel, and the charge storage 55 may be included in a green pixel, as shown in FIGS. 4 and 5.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

A metal wire (not shown) and a pad (not shown) may be disposed on the semiconductor substrate 110. In such an embodiment, the metal wire and the pad may include or be made of a metal having low resistivity to decrease signal delay. In one embodiment, for example, the metal wire and the pad may include aluminum (Al), copper (Cu), silver (Ag), and alloys thereof, but is not limited thereto. In an embodiment, the metal wire and pad may be disposed under the photo-sensing devices 50a and 50b, but are not limited thereto.

The lower insulation layer 60 may be disposed on the metal wire and the pad. The lower insulation layer 60 may include or be made of an inorganic insulating material such as a silicon oxide and/or a silicon nitride, or a low dielectric constant (low K) material such as SiC, SiCOH, SiCO, and SiOF. The lower insulation layer 60 has a trench for exposing the charge storage 55. The trench may be filled with fillers.

A color filter layer 70 may be disposed on the lower insulation layer 60. The color filter layer 70 includes a blue filter 70a disposed in the blue pixel and a red filter 70b disposed in the red pixel. In such an embodiment, a green filter is not included, but a green filter may be further included in an alternative embodiment.

The upper insulation layer 80 may be disposed on the color filter layer 70. The upper insulation layer 80 may eliminate a step caused by the color filter layer 70 and flatten a surface on the color filter layer 70. A contact hole (not shown) for exposing a pad and a through-hole 85 for exposing the charge storage 55 of a green pixel may be defined through the upper insulation layer 80 and lower insulation layer 60.

The organic photoelectric device 200 may be disposed on the upper insulation layer 80. The organic photoelectric device 200 includes a lower electrode 210 and an upper electrode 220 facing each other, and a light-absorbing layer 230 disposed between the lower electrode 210 and the upper electrode 220.

The lower electrode 210 and the upper electrode 220 may be light-transmitting electrodes, which transmit light in all wavelength regions, and the light-absorbing layer 230 may selectively absorb light in a green wavelength region and may replace a color filter of a green pixel.

In an embodiment, as described above, the semiconductor substrate 110 and the organic photoelectric device 200 selectively absorbing light in a green wavelength region have a stack structure and thereby the size of an image sensor may be reduced to realize a small-sized image sensor.

Focusing lens (not shown) may be further disposed on the organic photoelectric device 200. The focusing lens may control a direction of incident light and gather the light in one region. The focusing lens may have a shape of, for example, a cylinder or a hemisphere, but is not limited thereto.

In an embodiment, as shown in FIGS. 4 and 5, the organic CMOS image sensor may have a structure where the organic photoelectric device that selectively absorbs light in a green wavelength region is stacked on the semiconductor substrate 110, but the disclosure is not limited thereto. In an alternative embodiment, an organic photoelectric device that selectively absorbs light in a blue wavelength region may be stacked on the semiconductor substrate 110, and a green photo-sensing device and a red photo-sensing device may be integrated in the semiconductor substrate 110. In another alternative embodiment, an organic photoelectric device that selectively absorbs light in a red wavelength region may be stacked on the semiconductor substrate 110, and a green photo-sensing device and a blue photo-sensing device may be integrated in the semiconductor substrate 110.

Among the light in a visible wavelength region passing the lens barrel 21 and the optical filter 10, light in a green wavelength region may be mainly absorbed in the light-absorbing layer 30 and photoelectrically converted, and light in a blue wavelength region and a red wavelength region may pass the lower electrode 210 and be sensed by the photo-sensing devices 50a and 50b.

In an embodiment, as described above, the optical filter 10 may effectively transmit light in a visible wavelength region but absorb and block light in a near infrared wavelength region and thus transfer pure light in a visible wavelength region to an image sensor and resultantly, reduce or prevent a crosstalk generated when a signal by light in a visible wavelength region and a signal by light in a non-visible wavelength region are crossed and mingled in.

Hereinafter, embodiments of the invention will be described in greater detail with reference to examples.

Comparative Example 3

An optical filter is manufactured according to the same method as Example 1 except for using 5 wt % of a phthalocyanine compound (786PTC, KISCO) and 95 wt % of an organic binder.

Evaluation

The optical filter according to Examples and Comparative Examples are evaluated regarding a thickness and light absorption characteristics depending on a wavelength region.

The light absorption characteristics are measured by using a UV-Vis spectrophotometer (SoldiSpec-3700, Shimadzu Corp.).

The results are shown in Table 1.

TABLE 1

| | | Example 1 | Example 2 | Comparative Example 1 | Comparative Example 2 | Comparative Example 3 |
|---|---|---|---|---|---|---|
| Average light transmittance | 350 nm ≤ λ ≤ 380 nm | 0.4% | 0.4% | 0.4% | 0.4% | 0.4% |
| | 430 nm ≤ λ ≤ 630 nm | 82.3% | 81.0% | 83.1% | 83.8% | 74.7% |
| | 430 nm ≤ λ ≤ 565 nm | 87.3% | 86.7% | 87.5% | 87.7% | 88.6% |
| | 700 nm ≤ λ ≤ 900 nm | 26.5% | 25.3% | 39.5% | 42.1% | 89.7% |
| | 700 nm ≤ λ ≤ 740 nm | 4.1% | 2.4% | 7.9% | 7.7% | 81.4% |
| | 740 nm ≤ λ ≤ 900 nm | 32.0% | 30.9% | 47.4% | 50.5% | 91.9% |
| Maximum absorption wavelength ($\lambda_{max}$) | | 748 nm | 751 nm | 710 nm | 805 nm | 1087 nm |
| Thickness (μm) | | 83.5 μm | 84.1 μm | 84.9 μm | 105.8 μm | 108.9 μm |

However, these examples are merely exemplary, and the embodiments of the invention are not limited thereto.

Manufacture of Optical Filter

Example 1

A solution including 5 wt % of a cyanine-based compound (D5013, TCI) and 95 wt % of an organic binder (HT1335, SamHwa) is prepared.

The solution is bar-coated on a TAC film including a UV absorber, dried at 85° C. for 1 minute, and thermally cured at 85° C. for 2 minutes to form a near infrared absorbing layer and thus, manufacture an optical filter.

Example 2

An optical filter is manufactured according to the same method as Example 1 except for using a solution including 3.5 wt % of a cyanine-based compound, 1.5 wt % of a squarylium compound (B4642, TCI), and 95 wt % of an organic binder.

Comparative Example 1

An optical filter is manufactured according to the same method as Example 1 except for using 5 wt % of a phthalocyanine compound (745PTC, KISCO) and 95 wt % of an organic binder.

Comparative Example 2

An optical filter is manufactured according to the same method as Example 1 except for using 5 wt % of a diimmonium compound (1000A, KISCO) and 95 wt % of an organic binder.

Referring to Table 1, the optical filters according to Examples 1 and 2 show equal or high light transmittance in a visible wavelength region but low light transmittance in a near infrared wavelength region compared with the optical filters according to Comparative Examples 1 to 3. Particularly, the optical filters of Examples 1 and 2 have a maximum absorption wavelength ($\lambda_{max}$) in a range of 600 nm to 800 nm and low transmittance of less than about 7% and particularly, less than or equal to about 5% in a wavelength region from 700 nm to 740 nm, a boundary between visible wavelength region and infrared wavelength region, and thus may effectively absorb and block light in the near infrared wavelength region near to the visible wavelength region.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical filter comprising
   a polymer film, and
   a near infrared absorbing layer on the polymer film,
     wherein the near infrared light-absorbing layer transmits light in a visible wavelength region and selectively absorbs at least a part of light in a near infrared wavelength region,
   wherein an average light transmittance of the optical filter in an entire wavelength region of about 700 nanometers to about 740 nanometers is less than about 7%,
   wherein an average light transmittance of the optical filter in an entire wavelength region of about 740 nanometers to about 900 nanometers is equal to or less than 32%, and
   wherein the average light transmittance of the optical filter in the entire wavelength region of about 740 nanometers to about 900 nanometers is greater than the average light transmittance of the optical filter in the entire wavelength region of about 700 nanometers to about 740 nanometers.

2. The optical filter of claim 1, wherein the optical filter has a maximum absorption wavelength in a wavelength region of about 600 nanometers to about 800 nanometers.

3. The optical filter of claim 1, wherein the average light transmittance of the optical filter in the wavelength region of about 700 nanometers to about 740 nanometers is less than or equal to about 5%.

4. The optical filter of claim 1, wherein an average light transmittance of the optical filter in a wavelength region of about 700 nanometers to about 900 nanometers is less than or equal to about 30%.

5. The optical filter of claim 1, wherein an average light transmittance of the optical filter in a wavelength region of about 430 nanometers to about 630 nanometers is greater than or equal to about 80%.

6. The optical filter of claim 1, wherein the near infrared absorbing layer comprises:
   a near infrared absorption material which selectively absorbs the at least a part of the light in the near infrared wavelength region; and
   a binder.

7. The optical filter of claim 1, wherein the near infrared absorption material comprises a metal-free organic material.

8. The optical filter of claim 7, wherein the near infrared absorption material comprises a polymethine compound, a cyanine compound, a phthalocyanine compound, a merocyanine compound, naphthalocyanine, an immonium compound, a diimmonium compound, a triarylmethane compound, a dipyrromethene compound, an anthraquinone compound, naphthoquinone, a diquinone compound, a squarylium compound, a rylene compound, a perylene compound, a squaraine compound, a pyrylium compound, a thiopyrylium compound, a diketopyrrolopyrrole compound, a derivative thereof, or a combination thereof.

9. The optical filter of claim 6, wherein the binder is a thermosetting binder, a photocurable binder or a combination thereof.

10. The optical filter of claim 6, wherein the near infrared absorbing layer is obtained by coating a solution including the near infrared absorption material and the binder on the polymer film, and drying the polymer film on which the solution is coated.

11. The optical filter of claim 1, wherein the polymer film comprises polyethyleneterephthalate, polyethylenenaphthalate, triacetyl cellulose, polycarbonate, a cycloolefin polymer, poly(meth)acrylate, polyimide, or a combination thereof.

12. The optical filter of claim 1, wherein the polymer film selectively absorbs at least a part of light in an ultraviolet wavelength region.

13. The optical filter of claim 12, wherein an average light transmittance of the optical filter in a wavelength region of about 350 nanometers to about 380 nanometers is less than or equal to about 1%.

14. The optical filter of claim 1, further comprising:
   an infrared blocking layer on at least one of the polymer film and the near infrared absorbing layer.

15. The optical filter of claim 14, wherein
   the infrared blocking layer comprises a first layer and a second layer, which are alternately and repeatedly stacked one on another,
   wherein the first layer and the second layer comprise materials having different refractive indexes from each other, respectively.

16. The optical filter of claim 14, wherein the infrared blocking layer blocks light in a wavelength region of about 700 nanometers to about 3 micrometers.

17. The optical filter of claim 1, wherein the optical filter has a thickness in a range of about 30 micrometers to about 150 micrometers.

18. A camera module comprising the optical filter of claim 1.

19. The camera module of claim 18, further comprising a lens, and an image sensor.

20. An electronic device comprising the optical filter of claim 1.

* * * * *